Patented Jan. 28, 1936

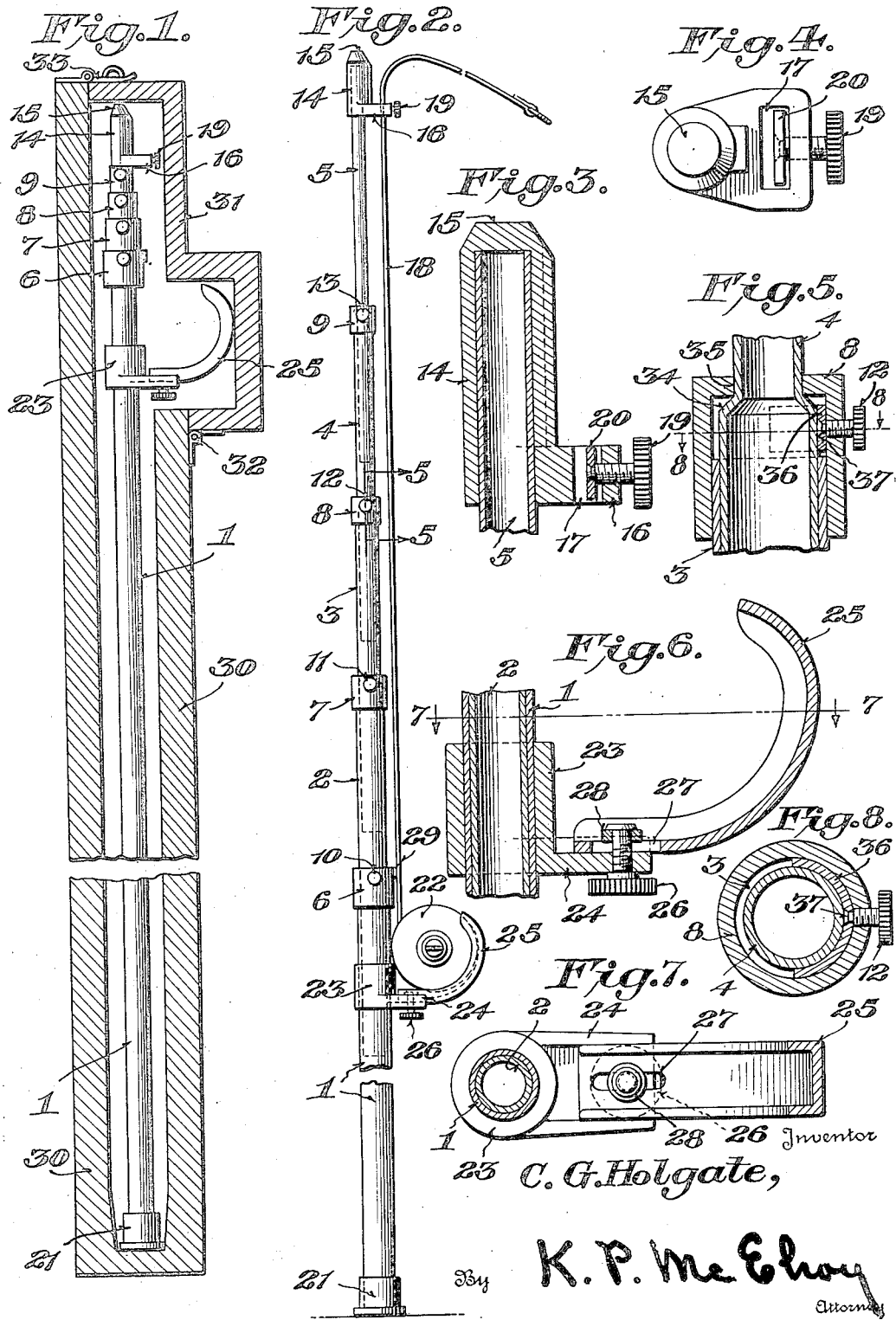

2,028,836

UNITED STATES PATENT OFFICE 2,028,836

TAPE CARRIER

Clarence G. Holgate, Milwaukee, Wis.

Application November 6, 1933, Serial No. 696,874

8 Claims. (Cl. 33—137)

This invention relates to tape carriers and it comprises a tape carrier formed of a composite extensible rod, means positioned on the rod at one end thereof for releasably supporting a reel tape measure, means positioned on the rod at the opposite end thereof for securing the free end of the tape measure and means for adjustably securing the rod in extended positions whereby when the rod is extended the distance desired to be measured the tape will be unwound from the reel and the distance determined by the amount of tape unwound, all as more fully hereinafter set forth and as claimed.

It is a desideratum in the art to which this invention relates to provide a tape carrier suitable for use by civil and construction engineers which shall be compact and convenient in use, which shall be readily adapted for measuring purposes by insertion in a support provided thereon of the usual engineer's reel type of tape measure and which shall enable one person to make quick and accurate measurements of short distances.

Civil and construction engineers in the practice of their professions are frequently met with the problem of measuring relatively short distances such as the distance from the top of a porch to the ground, the width of a room or the distance between two beams. The taking of such measurements usually requires two men, one to hold the end of the tape and the other to read the measurement. When the distance to be measured is in a vertical plane or in an inaccessible location it is frequently necessary to use a transit and to employ an assistant to hold a leveling rod. Sometimes the nature of the distance to be measured and the instruments available for measuring the same result in the necessity of making calculations in order to arrive at the correct figure.

Among the objects accomplished by the present invention is the provision of means for enabling one person to measure such distances with convenience and accuracy; the provision of means employing the usual engineer's reel type tape measure, an accurate instrument and a common part of every engineer's equipment, for measuring these distances; the provision of an extensible member or rod with means for attachment thereto of the tape reel at one end, means for securing the end of the tape measure at the other end and means for adjustably securing the rod in extended positions; the provision of means for securing the end of the tape to the end of the rod whereby the tape may be extended a distance beyond the end of the rod and thus enable direct measurements to be read at a point indicated on the rod; and the provision of a tape carrier for positioning one end of a tape measure into otherwise inaccessible places for the purpose of measuring the distance to points located therein.

Further objects and advantages of the invention will be apparent from the following detailed description read in connection with the accompanying drawing showing one form of a specific embodiment of my invention.

In the drawing:

Fig. 1 is a longitudinal sectional view through the box containing the tape carrier and shows the tape carrier collapsed and housed for storage and transportation;

Fig. 2 is a side elevation of the tape carrier with the tape reel in position and the carrier extended as when taking a measurement;

Fig. 3 is a detailed longitudinal sectional view of the tape holder at the end of the rod;

Fig. 4 is a top plan view of Fig. 3;

Fig. 5 is a detailed longitudinal sectional view taken along line 5—5 of Fig. 2 and shows the arrangement of the collar and adjusting screw at the joints between the rods;

Fig. 6 is a detailed longitudinal sectional view of the tape reel clamp;

Fig. 7 is a transverse sectional view of the tape reel clamp taken along line 7—7 of Fig. 6; and Fig. 8 is a transverse sectional view taken along line 8—8 of Fig. 5.

Referring to the drawing wherein like numerals indicate corresponding parts throughout the several views, the numerals 1 to 5 inclusive represent sections of preferably metallic tubing respectively, arranged to telescope one within the other as shown in Fig. 2. Tubes 1 to 4 inclusive are provided with collars 6, 7, 8 and 9 respectively which in turn are provided with knurled thumb screws 10, 11, 12 and 13 respectively for clamping the tubes in extended positions. Tube 5 is provided with a tape clamp 14 suitably secured to the end of the tube as by press fitting, welding, soldering, bolting and the like. This clamp has a hollow socket portion fitting over the end of the tube as shown, and a solid chamfered tip or toe portion 15 which forms the end of the tube. Projecting laterally is an arm 16 provided with a rectangular opening 17 through which the tape 18 is threaded. Knurled clamping bolt 19 in threaded engagement with the outer wall of the opening is provided with a ram 20 for clamping the tape flatly against the opposite wall of the opening. Tube 1, which is essentially the handle of the instrument, is provided at its lower end with a shoe or heel 21 and at a point adjacent its upper end with a tape reel support, clamp or socket for holding the tape reel 22. The arrangement shown consists of a sleeve 23 suitably secured to tube 1 as by welding, bolting and the like and provided with a laterally extending arm 24 channeled as shown in Fig. 7 to receive tape reel clamping claw 25. This claw is also channeled as shown in Fig. 7 and is adjustably arranged on arm 24 to slide towards and away from tube 1 for locking the tape reel in position and to accommodate reels of different sizes. Adjustment of the claw is made by means of knurled bolt 26 which extends through arm 24 and through a rectangular slot 27 in the end of the claw and is provided with a nut 28. Arm 24 being channeled the claw can only move in a straight line towards and away from the tube and the claw itself being channeled to receive the tape reel the reel is held against lateral displacement. For the purpose of providing a definite point at which the tape may be read a projection 29 is provided on collar 6. This projection extends laterally away from the collar and is provided with a flat face and straight edge over which the tape passes. To prevent tubes 2, 3, 4 and 5 from accidentally becoming separated when the instrument is extended, and to provide a more rigid assembly, they are expanded slightly at their lower ends to make a close fit within the adjacent tubes and provide shoulders 34 of greater diameter than the diameter of openings 35 in collars 6, 7, 8 and 9. In order that the tubes may be securely clamped to each other against slippage knurled thumb screws 10, 11, 12 and 13 are provided with semi-cylindrical rams 36 positioned in the spaces between the ends of the collars and the ends of the tubes to which the collars are attached. The rams are secured to the ends of the thumb screws by means of swivel joints 37, which permit the screws being turned independently of the rams and which prevents the screws from becoming unscrewed from the collars and getting lost. This is clearly shown in Figs. 5 and 6.

While Fig. 2 shows the tape carrier extended as in use, Fig. 1 shows it telescoped and boxed for storage and transportation. The box is represented by the numeral 30 and is provided with a cover 31 designed to accommodate the reel clamp and hinged as at 32. Suitable means may be provided for holding the cover shut and for locking the same such as hasp 33.

In use, the tape reel 22 is inserted in the tape reel clamp and locked in position by means of clamping screw 26. Tape 18 is then partially unwound from the reel and threaded through the opening in tape clamp 14 at the top of the carrier and allowed to extend beyond the clamp a distance equal to the distance from the shoe or heel at the bottom of the carrier to the straight edge or sight at which the reading is to be taken plus the distance from the tape clamp to the end of the tip. Originally extending the tape beyond the tape clamp as described, enables the actual measurement of the distance to be read at the sight. The tape is then clamped in this position by means of screw 19 and the carrier extended until the heel of the carrier rests at one point to be measured and the top of the carrier is at the other point. The carrier is then clamped in this position by means of screws 10, 11, 12 and 13. The amount of tape unwound, is indicated by reading the tape measure at the straight edge or sight provided by projection 29 and is the actual distance between the two points.

The carrier, as shown and described can be built to extend a distance of twenty feet or more and the parts when telescoped for transportation may not exceed four or five feet. Accurate measurements may be taken since the tape is at all times held an equal distance from the carrier. By securing the tape reel to the carrier both hands of the operator are free to steady the carrier and record the measurements. The tape carrier is simple and inexpensive in manufacture and strong and durable in use. It is a labor saver in that it permits one person to take measurements which usually require two or more persons. The use of the tape reel with the carrier is an advantage over a graduated rod since it provides a more accurate and less expensive instrument to manufacture.

What I claim is:

1. A tape carrier adapted for use with the usual surveyor's-type tape reel measure, comprising an extensible rod, socket means on the side of the rod adjacent one end thereof adapted to receive and releasably clamp the reel of the tape to the rod, and means on the rod adjacent the other end thereof for releasably securing the free end of the tape to the rod.

2. A tape carrier comprising an extensible rod, adjustable clamping means mounted on the side of the rod near one end therof, said means adapted to releasably engage a tape reel measure of the type in general use by contractors and surveyors, and hold said reel adjacent the side of the rod, and means at the opposite end of the rod for releasably holding the free end of the tape.

3. A tape carrier comprising an extensible rod, adjustable clamping means at one end of the rod adapted to releasably engage the reel of a tape measure of the type in general use by contractors and surveyors, and means at the opposite end of the rod for releasably holding the free end of the tape; both the means for engaging the reel of the tape measure and the means for engaging the free end of the tape adapted to engage said reel and tape without the necessity of in any way altering the construction of the reel or the tape.

4. A tape carrier comprising an extensible rod formed of a plurality of sections, one of said sections serving as a handle and provided with means adjustable toward and away from the handle for releasably securing a tape reel measure thereto in a position such that the plane of the reel is in the longiudinal plane of the rod and so that the tape may unwind from the reel adjacent and parallel to the rod, and means on another of said sections disposed at the end of the rod opposite the handle for releasably securing the free end of the tape when unwound from the reel.

5. A tape carrier comprising an extensible rod formed of a plurality of sections one of which serves as a handle at one end of the rod and is provided with adjustable means for releasably securing a tape reel adjacent the side thereof and another of which sections forms the opposite end of the rod and is provided with means for releasably holding the free end of the tape when unwound from the reel, and a sight for reading the tape positioned on said handle to register with the tape.

6. In a tape carrier of the kind described a tape reel clamp comprising a channeled claw shaped member adapted to partially encompass the reel of a tape reel measure, an outwardly extending member secured to said carrier and adapted to support said claw, and adjustable means connecting said claw to said member whereby the claw may be moved toward and away from the rod to releasably clamp the reel to the side of the carrier.

7. A tape carrier comprising an extensible rod formed of a plurality of sections, one of which serves as a handle at one end of the carrier and is provided with adjustable means for releasably securing a tape reel adjacent the rod, another of which sections forms the opposite end of the rod and is provided with means for releasably holding the free end of the tape when unwound from the reel, and a sight on the handle section of the rod registering with the tape, said means for holding the free end of the tape having an opening therethrough through which the tape measure may be threaded to extend a distance beyond the tape holding means for the free end of the tape equal to the distance from the tip of the handle to the sight plus the distance from the tip of the opposite end of the rod to the tape holding means for the free end of the tape so that the distance indicated by the measure at the sight is the length of the rod from tip to tip.

8. A tape carrier comprising an elongated rod, tape reel carrying means secured to the rod near one end thereof for holding a reel on the outside of the rod, a tape reel carried by said means, securing means near the other end of the rod for the free end of the tape when unwound from the reel, whereby the tape when unwound is held substantially parallel to the rod between the reel and said securing means, and a sight on the rod at a predetermined position between the reel carrying means and the said securing means.

CLARENCE G. HOLGATE.